(12) United States Patent
Krause

(10) Patent No.: US 10,742,008 B2
(45) Date of Patent: Aug. 11, 2020

(54) CONDUIT STUB-UP ASSEMBLY

(71) Applicant: CSUE Technologies, Inc., Niles, IL (US)

(72) Inventor: Jeffrey Krause, Niles, IL (US)

(73) Assignee: CSUE TECHNOLOGIES, INC., Niles, IL (US)

( * ) Notice: Subject to any disclaimer, the term of this patent is extended or adjusted under 35 U.S.C. 154(b) by 361 days.

(21) Appl. No.: 15/411,295

(22) Filed: Jan. 20, 2017

(65) Prior Publication Data

US 2017/0179699 A1    Jun. 22, 2017

Related U.S. Application Data

(63) Continuation-in-part of application No. 14/865,893, filed on Sep. 25, 2015, now Pat. No. 10,320,167, and a continuation-in-part of application No. 14/244,938, filed on Apr. 4, 2014, now abandoned.

(60) Provisional application No. 62/055,013, filed on Sep. 25, 2014, provisional application No. 62/130,881, filed on Mar. 10, 2015, provisional application No. 61/808,785, filed on Apr. 5, 2013.

(51) Int. Cl.
| | |
|---|---|
| *H02G 9/06* | (2006.01) |
| *H02G 3/04* | (2006.01) |
| *F16L 29/00* | (2006.01) |
| *F16L 37/28* | (2006.01) |
| *F16L 55/10* | (2006.01) |

(52) U.S. Cl.
CPC ............ *H02G 3/0481* (2013.01); *F16L 29/00* (2013.01); *F16L 37/28* (2013.01); *F16L 55/10* (2013.01); *H02G 3/0493* (2013.01); *H02G 9/06* (2013.01)

(58) Field of Classification Search
CPC ...... H02G 3/0481; H02G 3/0493; H02G 9/06; F16L 29/00; F16L 37/28; F16L 55/10
USPC ............................................ 285/230, 64, 56
See application file for complete search history.

(56) References Cited

U.S. PATENT DOCUMENTS

| | | | | |
|---|---|---|---|---|
| 2,207,565 A | * | 7/1940 | Wackman ............ | B65D 39/082 220/304 |
| 2,772,017 A | * | 11/1956 | Rieke ................... | B65D 39/084 220/265 |
| 3,110,754 A | * | 11/1963 | Witort .................. | H02G 3/0481 138/114 |

(Continued)

FOREIGN PATENT DOCUMENTS

AU            39127/89        *   2/1990

*Primary Examiner* — David Bochna
*Assistant Examiner* — James A Linford
(74) *Attorney, Agent, or Firm* — Wood, Phillips, Katz, Clark & Mortimer

(57) ABSTRACT

A stub-up form for providing access to an in-slab connector has an opening with a threaded element of a select diameter corresponding to size of an elongate tubular element to be received therein. The form comprises a hollow unitary plastic body comprising an elongate tubular wall having a shoulder connected to a narrowed cylindrical neck closed at a distal end wall to define an interior space. The elongate tubular wall is of a diameter greater than the select diameter and the neck has a size to be removably received in the opening and is engageable by the threaded element. A receptacle extends from the distal end wall inwardly into the interior space for receiving a tool head for removal of the form from an in-slab connector, in use.

20 Claims, 14 Drawing Sheets

(56) References Cited

U.S. PATENT DOCUMENTS

| | | | | |
|---|---|---|---|---|
| 3,469,817 A | * | 9/1969 | Bowden | E04G 15/063 |
| | | | | 249/134 |
| 3,856,172 A | * | 12/1974 | Walles | A47J 41/022 |
| | | | | 215/364 |
| 4,758,003 A | * | 7/1988 | Goldstein | F16L 5/04 |
| | | | | 174/76 |
| 5,509,564 A | * | 4/1996 | Knoop | B65D 39/082 |
| | | | | 220/360 |
| 2005/0188649 A1 | * | 9/2005 | Hagen, Jr. | B29C 44/186 |
| | | | | 52/782.1 |
| 2006/0192033 A1 | * | 8/2006 | Dansizen | B01F 5/0619 |
| | | | | 239/414 |
| 2006/0278644 A1 | * | 12/2006 | Baughman | B65D 39/084 |
| | | | | 220/304 |

* cited by examiner

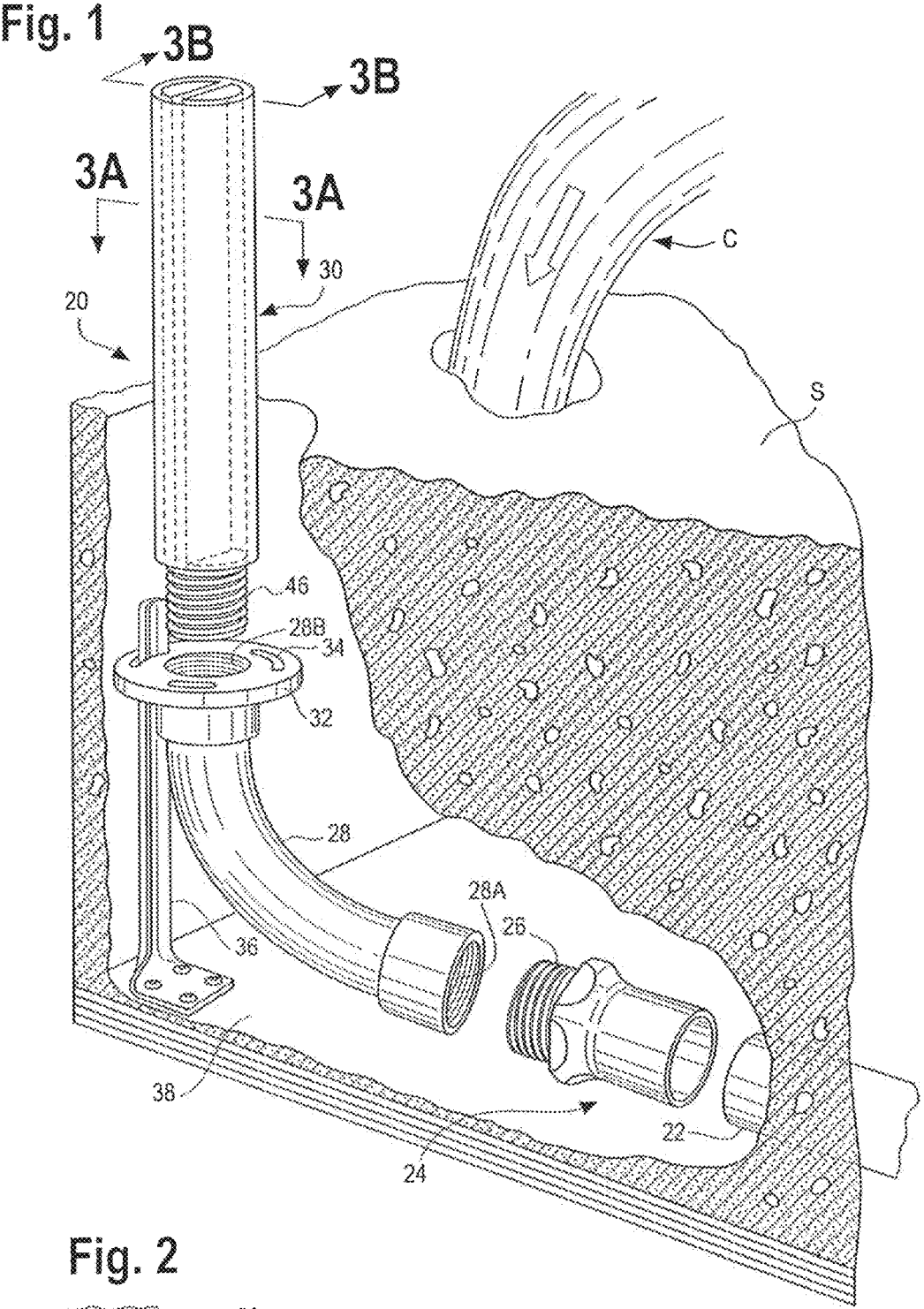
Fig. 1
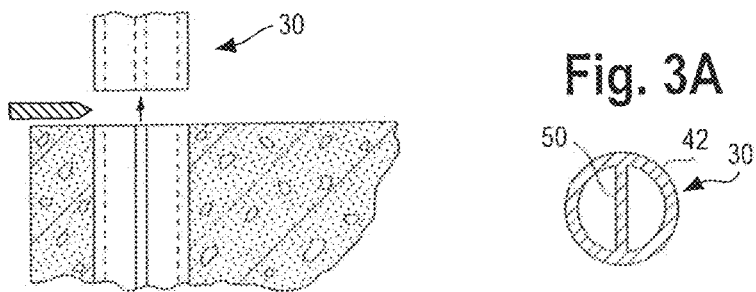
Fig. 2
Fig. 3A

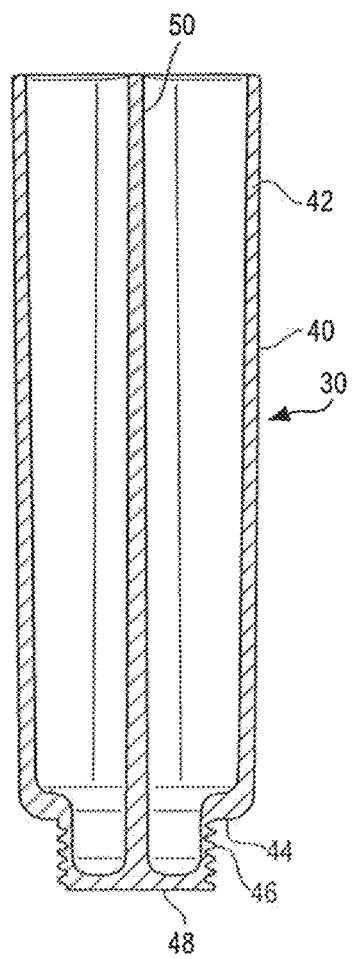

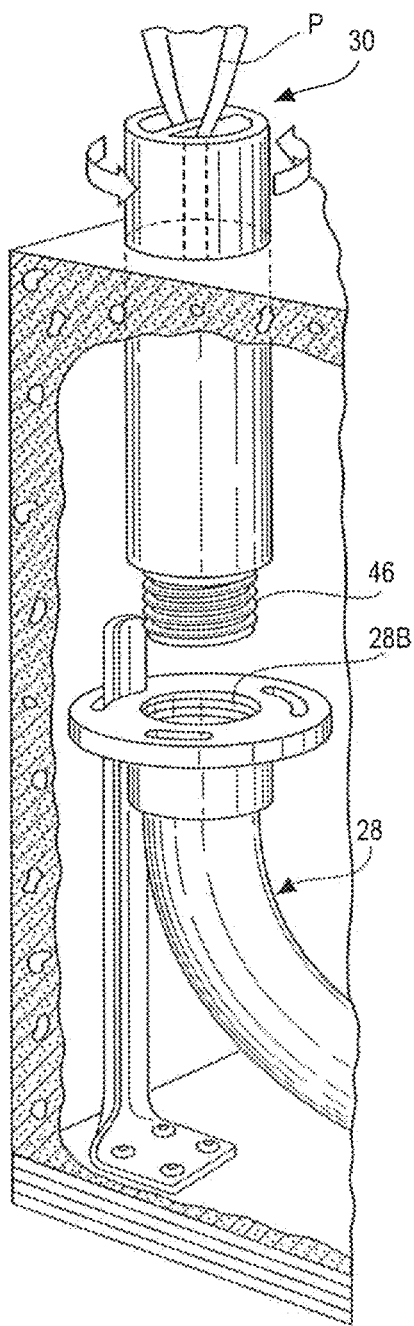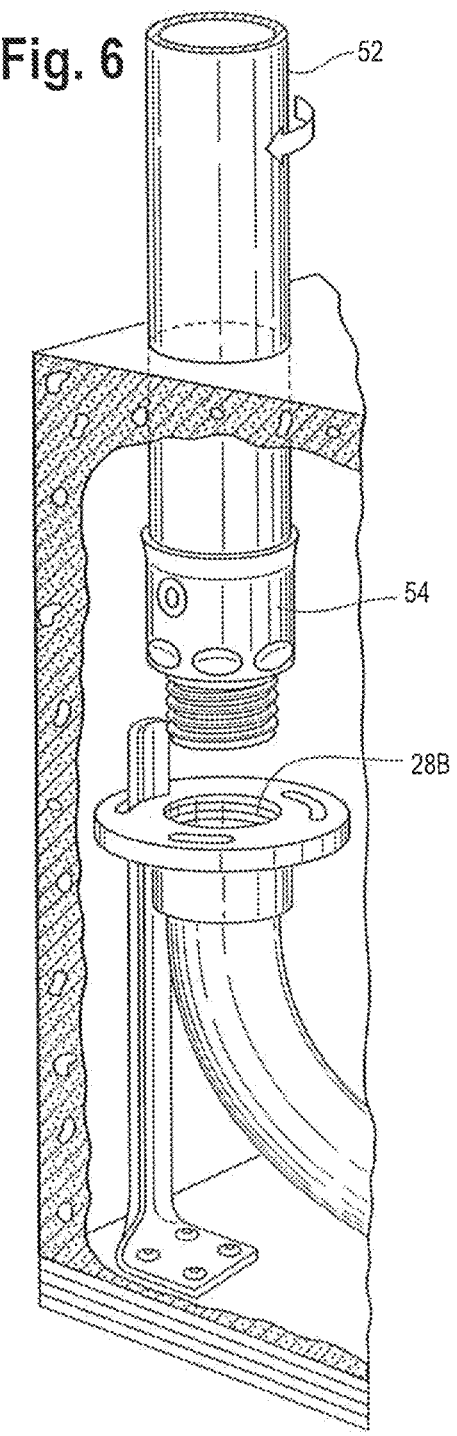

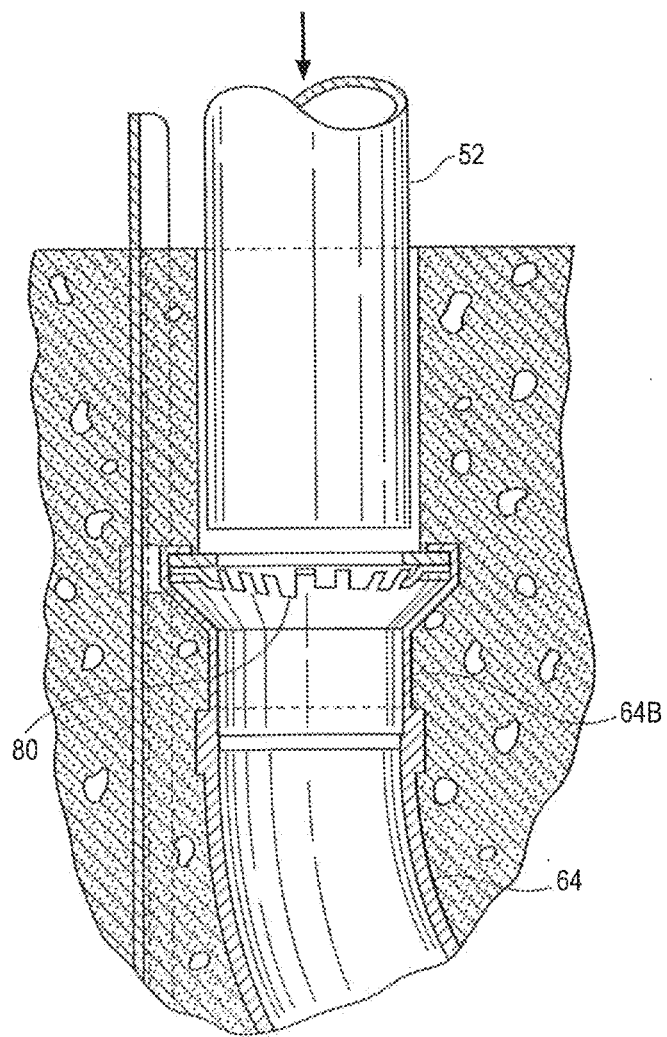

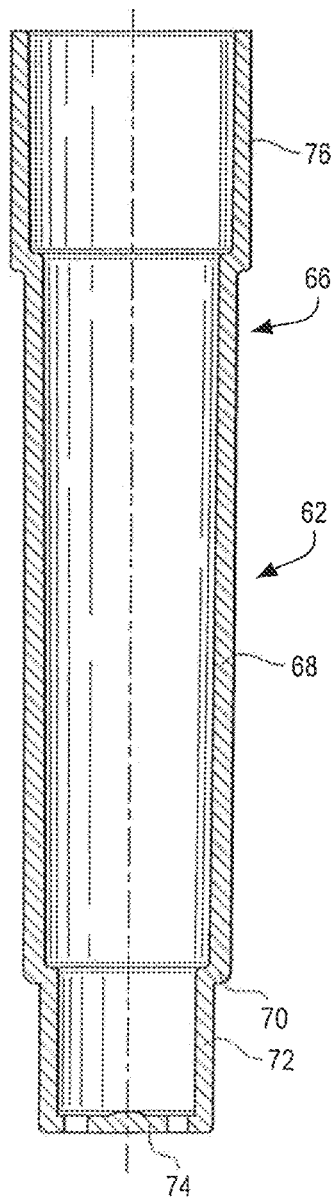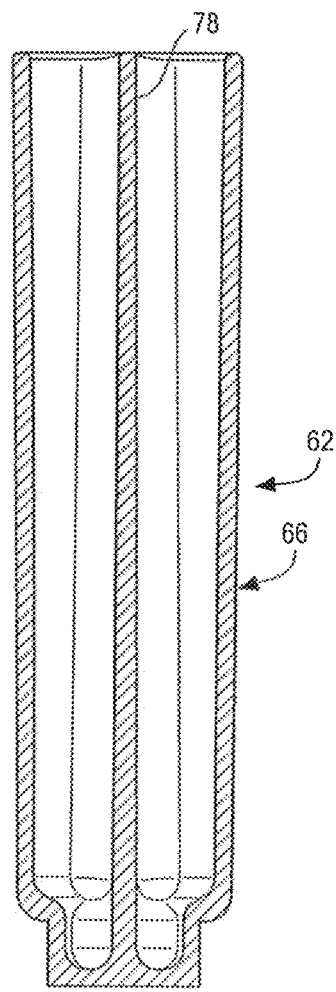

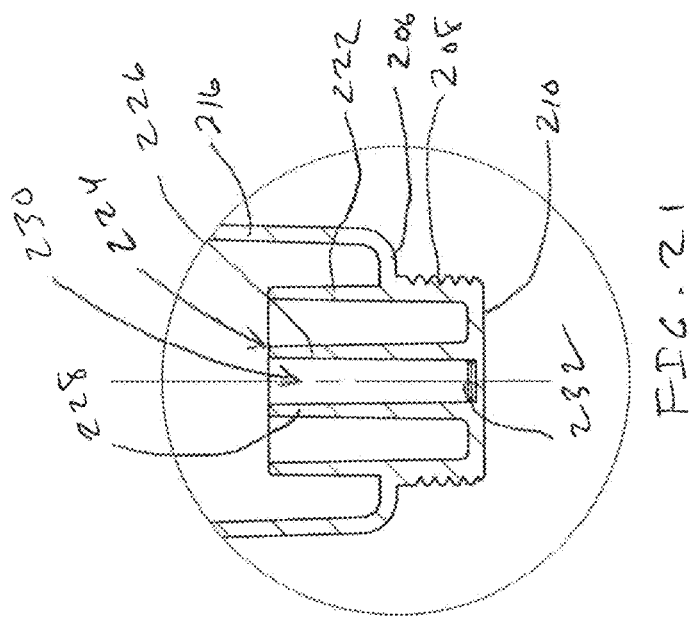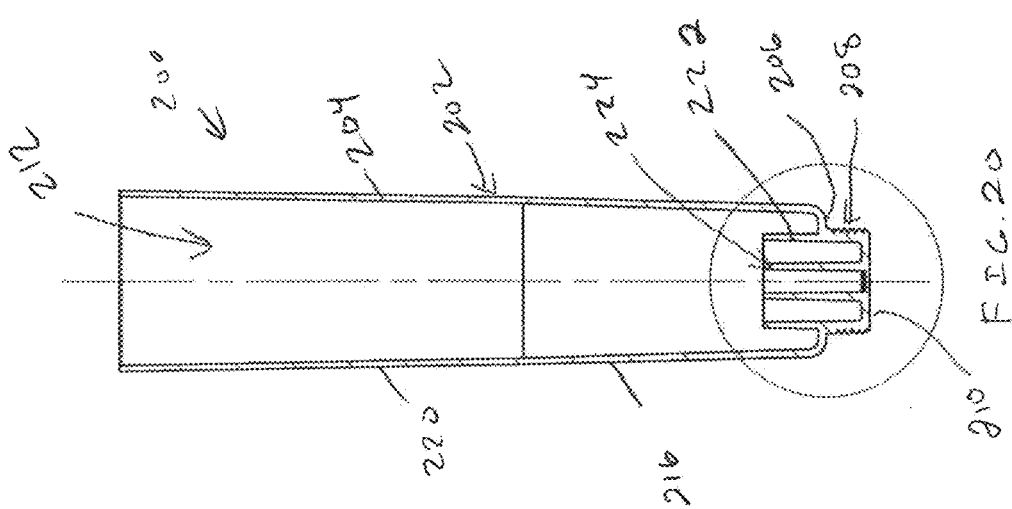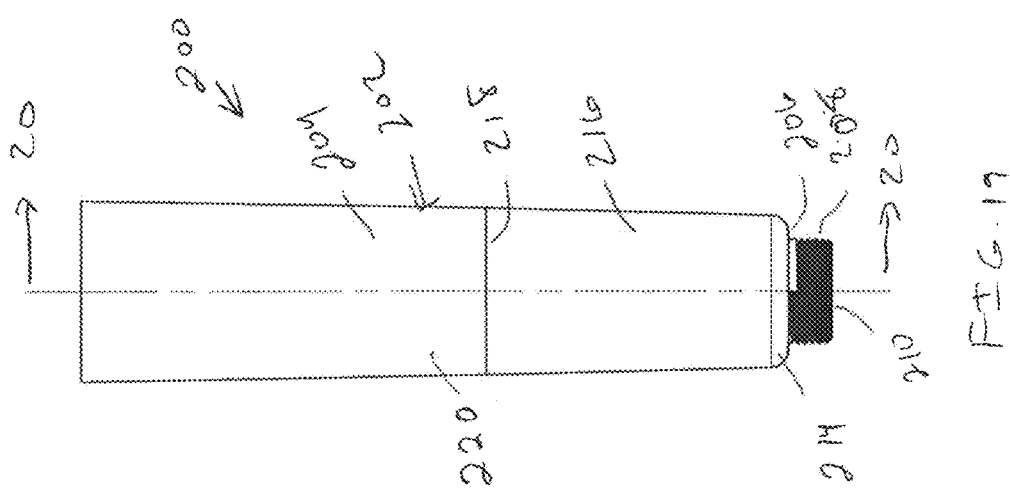

CONDUIT STUB-UP ASSEMBLY

CROSS-REFERENCE TO RELATED APPLICATIONS

The present application is a continuation-in-part of application Ser. No. 14/865,893 filed on Sep. 25, 2015 which claims the benefit of U.S. provisional patent application Ser. No. 62/055,013, filed on Sep. 25, 2014, and U.S. provisional patent application Ser. No. 62/130,881, filed on Mar. 10, 2015 and is a continuation-in-part of U.S. application Ser. No. 14/244,938, filed Apr. 4, 2014, which claims the benefit of provisional Application Ser. No. 61/808,785, filed on Apr. 5, 2013.

FEDERALLY SPONSORED RESEARCH OR DEVELOPMENT

Not Applicable.

MICROFICHE/COPYRIGHT REFERENCE

Not Applicable.

FIELD OF THE INVENTION

The present disclosure generally relates to electrical conduit connections, and more particularly pertains to assemblies and methods suitable for in-slab conduit connections.

BACKGROUND

In slab-on-grade, suspended slab concrete structures and slab-on-metal deck construction it is often a standard practice to install electrical conduit raceways within the body of the concrete slab. In order to be able to continue the conduit raceway vertically after concrete placement, the conduit is left extending above the top of slab approximately, for example, six to twelve inches above the top of the slab, to allow the in-slab conduit to be coupled to the future extension of the raceway. This section of conduit extending above the final slab elevation is commonly referred to as a "conduit stub-up". The conduit stub-up may enable the use of conventional conduit couplings, such as a set-screw fitting, which may sleeve over the two pieces of conduit being joined together.

Because the conventional conduit stub-up extend above the top surface of the concrete slabs, some form of protection may often be provided around conduit stub-ups to reduce the likelihood of damage to the conduit as well as injury to unaware and/or unsuspecting workers or lay people. For example, damage to the conduit may make it difficult and expensive, perhaps prohibitively so, to couple the in-slab conduit to an additional section of conduit above the slab. In addition to possible damage to the conduit itself, the conduit stub-ups extending above the concrete slab may pose a tripping, impalement, or other safety hazard. For these reasons, various approaches may be utilized to identify and/or protect the protruding conduit stub-up (and/or to protect individual from safety hazards associated with the conduit stub-up). Examples of attempted safety measures may include spraying the conduit stub-ups and supporting structure with safety orange paint, attaching flags to the conduit stub-ups, covering the conduit stub-ups with miscellaneous objects such as CMU blocks and painting the objects a safety orange, and, in situations where groupings of conduit stub-ups occur in-line with each other, wood blocking may be strapped to stub-ups in order to protect them from damage and sprayed with orange safety paint to make them more visible.

This application is directed to improvements in providing in-slab conduit connections.

SUMMARY

There is disclosed herein a stub-up form for providing access to an in-slab connector having an opening with a threaded element of a select diameter corresponding to size of an elongate tubular element to be received therein. The form comprises a hollow unitary plastic body comprising an elongate tubular wall having a shoulder connected to a narrowed cylindrical neck closed at a distal end wall to define an interior space. The elongate tubular wall is of a diameter greater than the select diameter and the neck has a size to be removably received in the opening and is engageable by the threaded element. A receptacle extends from the distal end wall inwardly into the interior space for receiving a tool head for removal of the form from an in-slab connector, in use.

It is a feature that the neck comprises a threaded neck.

It is another feature that the receptacle comprises opposite planar walls extending across an inside of the neck.

It is a further feature that the neck extends inwardly of the shoulder into the interior space to define an inner cylindrical wall.

It is an additional feature that the inner cylindrical wall surrounds the receptacle.

It is yet another feature that the receptacle comprises opposite planar walls extending across the inner cylindrical wall.

It is still a further feature that the distal end wall has a reduced thickness in an area surrounded by the receptacle.

It is a feature that the tubular wall has a draft of about 2°. The tubular wall may have a lower portion, proximate the shoulder, and an upper portion, and wherein the lower portion has a draft of about 2° and the upper portion has a uniform diameter.

It is a further feature that the conduit stub-up form has a generally uniform wall thickness of about .08".

It is yet another feature that a foam insert is in the interior space. The foam insert may extend into the receptacle.

There is disclosed in accordance with another aspect a conduit stub-up form for providing access to an in-slab conduit connector having an opening with a threaded element of a select diameter corresponding to size of an elongate conduit to be received therein. The form includes a hollow unitary plastic body comprising an elongate tubular wall having a shoulder connected to a narrowed cylindrical threaded neck closed at a distal end wall to define an interior space. The elongate tubular wall is of a diameter greater than the select diameter and the neck has a size to be removably received in the opening and is engageable by the threaded element. A receptacle comprises a pair of opposite planar walls extending from the distal end wall inwardly into the interior space for receiving a planar tool head for removal of the form from an in-slab conduit connector, in use.

Other features and advantages will be apparent from a review of the entire specification, including the appended claims and drawings.

BRIEF DESCRIPTION OF THE DRAWINGS

FIG. 1 is a perspective view of use of a conduit stub-up form in accordance with a first embodiment of the invention;

FIG. 2 is a sectional view illustrating removal of a portion of the stub-up form, in use;

FIG. 3A is a sectional view taken along the line 3A-3A of FIG. 1;

FIG. 3B is a sectional view taken along the line 3B-3B of FIG. 1;

FIG. 5 is a partial perspective view, similar to FIG. 1, illustrating removal of the conduit stub-up form;

FIG. 6 is a partial perspective view, similar to FIG. 5, illustrating installation of a conduit subsequent to removal of the conduit stub-up form;

FIG. 11 is a sectional view, similar to FIG. 9, illustrating insertion of a conduit;

FIG. 12A is a sectional view of the conduit stub-up form used with the embodiment of FIG. 7;

FIG. 12B is a sectional view, similar to that in FIG. 12A, of a conduit stub-up form including a central interior wall to aid in removal of the conduit stub-up form;

FIG. 19 is a side elevation view of the form of FIG. 17.

FIG. 20 is a sectional view taken along the line 20-20 of FIG. 19;

FIG. 21 is a detail view taken from FIG. 20; and

DETAILED DESCRIPTION

Figure 4:
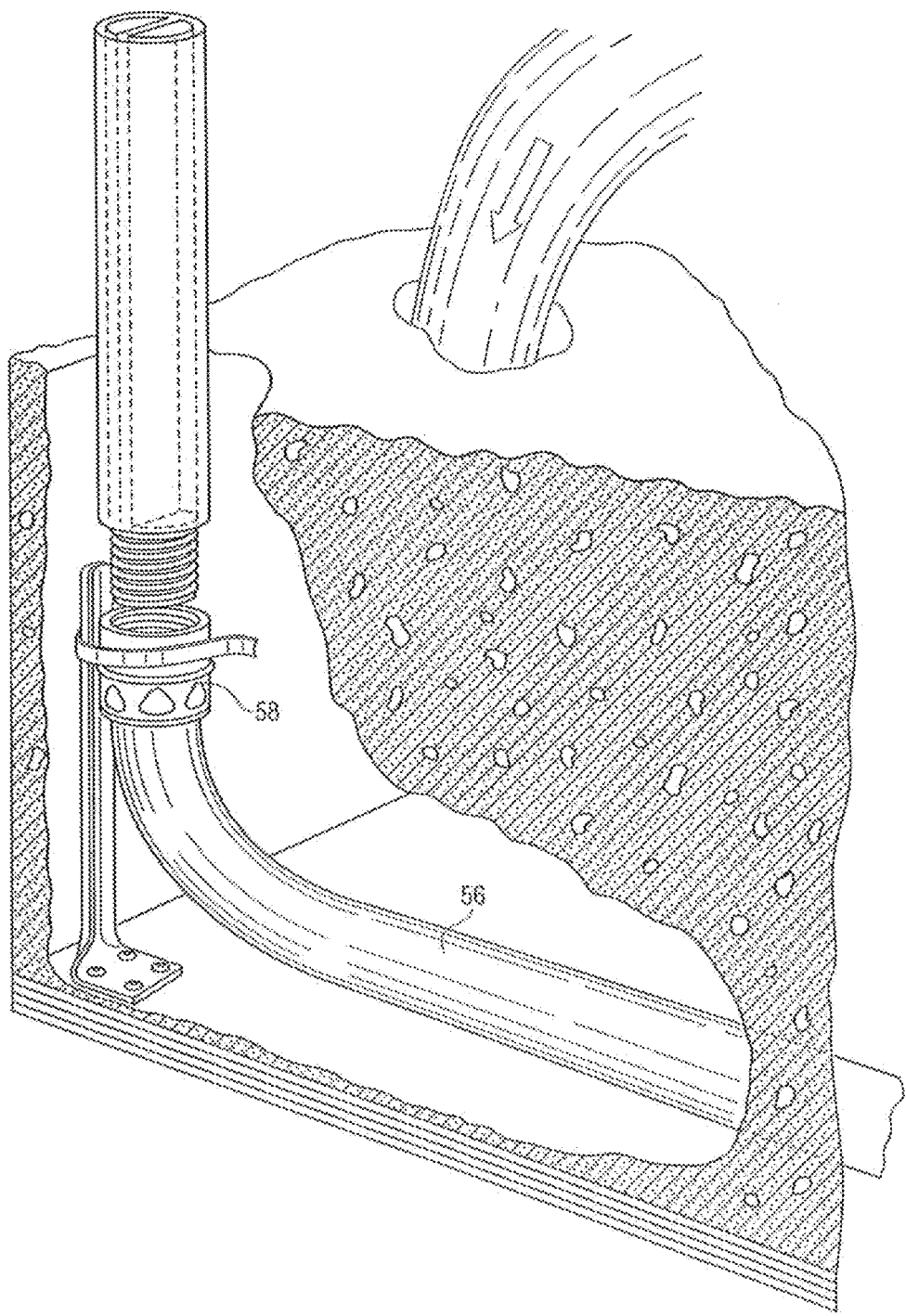
FIG. 4 is a perspective view, similar to FIG. 1, illustrating a different conduit configuration.

The potential problems and hazards associated with conduit or raceway stub-ups protruding above a concrete slab, or other surface, may be at least partially, and/or completely alleviated by eliminating and/or reducing the conduit stub-up. In some embodiments, eliminating and/or reducing the conduit stub-up may be accomplished while allowing two sections of conduit (e.g., a section of conduit disposed at least partially below the finish elevation of the concrete slab and a section of conduit to extend upwardly out from the concrete slab) to be joined or coupled together at least partially within the body of the concrete slab. In some embodiments, the coupling of the two conduit/raceway sections may be accomplished after the placement of the concrete and, in some situations, the two conduit sections may be coupled no sooner than a time when the vertical raceway element can be completely obstructed by partitions. In an embodiment, the present disclosure may allow a chase, or opening to be created into the surface of the concrete slab and extending down to an embedded coupling within the body of the slab, A section of conduit may be inserted into the chase, down to the coupling, and coupled to the embedded conduit via the coupling, at a point in time when partitions are being installed in the sequence of construction, thus eliminating any potential damage to the embedded conduit and remove any trip or impalement safety issues extending above top of slab elevation.

As shown in the accompanying drawings, a push-on connector or threaded connector may be attached to a section of conduit that will be below the final grade of a concrete slab. Attaching the connector to the section of conduit may include attaching the connector to a run of conduit that has a 90 degree bend in it (e.g., so that the end of the 90 degree bend may be pointing generally vertically upward), or may include providing the connector on a short piece of conduit that has a 90 degree bend in it, which can be attached to a horizontal run of conduit that will be buried, or embedded, in the slab once the slab is poured. According to either such situation, or other similarly suitable configurations, a generally vertically oriented connector may be provided (although in other embodiments, the connector could be horizontally oriented or oriented at an angle, if that is the desired direction of the run of conduit that will be added after the slab is poured).

In general, a stub-up form may include a sleeve, tube, or other body that may be coupled to the connector and may extend upwardly from the connector to a height that may be above the intended final grade or elevation of the concrete slab that is to be poured. In an embodiment, the stub-up form may be about 6 inches tall, to accept any generally standard variations in concrete slab thickness. However, the height of the stub-up form may vary depending, for example, on an intended thickness of the concrete slab and a general depth of the connector within the intended concrete slab. As generally mentioned, the stub-up form may be of sufficient height to extend above the surface of the concrete slab once poured.

The connector may include a metal body or sleeve, that may provide an electrical connection between the section of conduit buried in the concrete slab and the section of conduit inserted through the opening in the concrete slab created by the stub-up form. This electrical connection may provide a continuous ground between the new piece of conduit and the conduit buried in the slab.

Example embodiments of a conduit stub-up arrangement may include one or more of the features set forth below. A push-on/push-in conduit connector (herein commonly referred to as "push-on" conduit connector) may be attached to a piece of conduit to be embedded/buried in a concrete slab. A bottom end of the stub-up form/sleeve/tube may be pushed into the other end of the push-on connector so the stub-up form extends above the intended top of the slab to be poured. The stub-up form has sufficient mechanical strength to resist the rigors of concrete placement and finishing operations—e.g., without breaking or becoming displaced. The form may include a gasket or O-ring to seal against the connector to further protect against concrete or water/moisture seeping into the connector or raceway. The stub-up form may have a smooth surface (e.g., plastic such as HDPE) to prevent concrete from bonding to the stub-up form. The stub-up form may be slightly tapered to make it easier to pull out of the slab after the concrete sets. The top of the stub-up form may include a hexagonal, square, etc. shape at a point that will be above the slab. This allows a wrench, etc., to be used to twist the stub-up form to screw it out of the push-on conduit connector.

Once the stub-up form is attached to the piece of conduit raceway that is to be buried in the slab, it may be attached to a separate supporting device that is attached to formwork, metal deck or embedded in subgrade to support the entire system during the placement of concrete until concrete is cured and sleeve (by itself) is removed from the cured concrete to leave behind a chase or raceway for the final conduit extension to be inserted through into the connector.

After the concrete slab is poured (with the top of the stub-up connector sticking above the top surface) and hardens, the stub-up form can be removed from the concrete slab (e.g., by twisting the stub-up form out of the connector to leave a hole going down into the concrete slab and the conduit connector buried in the slab. The hole could be about the same diameter as the outside diameter of a piece of conduit or larger. A piece of conduit can be inserted through the hole in the concrete slab and secured to the connector to create a continuous conduit run extending from the buried piece of conduit and the buried conduit connector.

After the stub-up form is removed and before it is time to install the piece of conduit sticking up out of the slab, a plug could be put in/over the hole to keep debris out of the hole. This cap could be a part of the overall stub-up form that could be detached by only being perforated to the top of the form and detached at the same time as removing the form and then inserted into the top of the concrete hole.

Without anything sticking up from the slab (before the next piece of conduit is attached) tripping, falling and/or impalement hazards might be reduced eliminated, while still allowing further pieces of conduit to be attached to provide continuous conduit runs that go into the slab.

In general, implementations of the present disclosure provide conduit stub-up arrangements that allow in-slab conduit raceway sections to be coupled with conduit raceway sections extending above the slab. In some implementations, the conduit stub-up arrangements may reduce, or eliminate, any features extending above the surface of the concrete slab prior to the point in time at which the above-slab conduit sections are coupled with the in-slab conduit sections. By reducing, or eliminating, features extending above the top surface of the concrete slab, the potential for damage to the conduit raceway (also referred to herein as "conduit"), which could make it difficult and/or expensive to join the damaged conduit raceway to additional conduit raceway section, may also be reduced and/or eliminated. As such, in some embodiments, the potential time and/or expense associated with repairing damaged conduit stub-ups may be reduced and/or eliminated. Similarly, by reducing, or eliminating, features extending above the top surface of the concrete slab, the potential tripping, impalement, or other safety hazards may also be reduced and/or eliminated.

The conduit stub-up form is used with an associated conduit connector in connection with electrical conduit on a building deck during construction and prior to pouring of concrete. The deck may include several conduit raceways each turned upwardly to a conduit connector. Prior to pouring the conduit, a stub-up form is removably secured to the connector. After the concrete is poured and hardens, then the stub-up form is removed leaving an opening through which a conduit can be inserted at the appropriate time during the building electrical construction phase.

FIG. 1 illustrates a conduit stub-up form assembly 20 in accordance with one embodiment. This is shown in exploded fashion for connection to a horizontal conduit run 22 having a straight on connector 24 with a threaded end 26. The conduit stub-up form assembly comprises a low profile or short radius 90 degree elbow 28 and a removable stub-up form 30.

The 90 degree elbow 28 is produced out of a conductive metal such as zinc or aluminum with a standard sweeping radius for approx. 45 degrees with the remaining 45 degrees being crimped at a single joint to complete the 90 degree bend. This type of bend allows for larger diameter conduit to maintain the coupled joint within the shallow depths of the concrete slab. The elbow 28 has a first threaded opening 28A at one end and a second threaded opening 28B at an opposite end. A round flange 32 surrounds the second opening 28B, on the end closest to the top of concrete, with slots 34 to receive a support standee 36 anchored to a form work/substrate 38. The first threaded opening 28A is threadably connected to the connector 24.

The stub-up form 30, see also FIG. 3B, comprises a hollow plastic cylindrical body 40 formed by an elongate tubular wall 42 having a shoulder 44 connected to a narrowed cylindrical threaded neck 46 closed at a distal end by an end wall 48. The size of the threaded neck 46 is adapted to be received in the second threaded opening 28B of the elbow 28. This could be sized for ¾" conduit or any other size conduit, as necessary. A cross piece, defined by a central interior wall 50, extends across the hollow cylindrical body 40 to aid in removal of the form 30, as described below.

The stub-up form 30 may be formed of one piece plastic construction so that it is light weight, inexpensive to produce and disposable. The tubular wall may include a draft of about 1° and a generally uniform wall thickness of about 0.075 inches. As will be apparent, the invention is not specifically limited to such a draft or wall thickness.

In use, the stub-up form 30 is removably secured to the elbow 28 by threading the neck 46 into the second threaded opening 28B. Subsequent to assembly of all the parts, the concrete slab S is poured as illustrated at C in FIG. 1. Once the concrete slab S hardens, then the stub-up form 30 above the slab S can be cut off as illustrated in FIG. 2 to expose a remaining part of the stub-up form 30 which is illustrated in cross-section in FIG. 3A. The cutoff stub-up form 30 can remain to prevent debris from falling into the raceway. Prior to installing a conduit, the stub-up form 30 can be removed from the concrete slab using pliers P or the like to aid in turning the form, as illustrated in FIG. 5, to unthread the form 30 from the second threaded opening 28B. Thereafter, a conduit 52 with a threaded connector 54 is inserted into the hole in the concrete and into the elbow second opening 28B, as shown in FIG. 6. As will be apparent, the diameter of the stub-up form 30, above the shoulder, is slightly larger than the size of the conduit end connector 54 to allow insertion of the same.

The threaded design of the stub-up form 30 allows for the use of both EMT (thin-wall non-threaded conduit) as well as RMC (heavy-wall threaded conduit). EMT itself is not threaded, but can be used with threaded fittings or adapters The threaded stub-up form 30 can be coupled onto the end of a standard bent radius EMT conduit raceway that is embedded in concrete using a standard compression coupling with a threaded female end to receive the plastic sleeve insert that will allow for future access of the conduit raceway. FIG. 4 illustrates use of the same stub-up form 30 with such a conduit raceway 56 having a bend and ending in a threaded connector 58. As such, a stub-up form assembly comprises the form 30 and the connector 58. In all other respects, the stub-up form 30 operates similar to that discussed above relative to FIG. 1. In slab-on-grade applications where RMC conduit is used the threaded connection could be used to eliminate the separate fitting.

The stub-up form 30 may be manufactured of different sizes according to the size of the conduit used in the raceway. Moreover, the tubular wall 40 may be of a diameter greater than the threaded neck 46 which is of a size to be removably received in the connector second opening 28B. The tubular wall 40 being of a larger size provides a larger opening than the conduit size to provide space for the conduit and any connectors to be received in the resulting opening and also prevents concrete from getting into the connector opening 28B. The outer diameter of the tubular wall may be in the range of ¾" to ⅞" greater than the diameter of the neck 46. Advantageously, the resulting opening will provide a minimum annular space, on the order of ¼", between the concrete and the extended vertical raceway/conduit to maintain structural integrity and fire ratings. The invention is not intended to be limited to any particular size relationship.

FIGS. 7-11, 12A and 12B illustrate an alternative embodiment. In this embodiment, a conduit stub-up form assembly 60 includes a conduit stub-up form 62 and a push-on second connector 64B. The push on second connector 64B is provided on an elbow 64 with an opposite first connector 64A.

Figure 7:
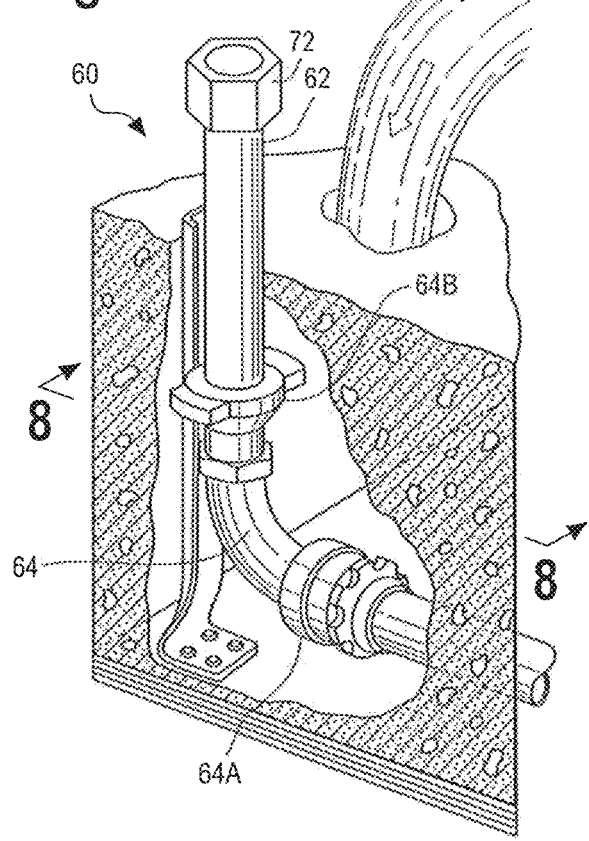
FIG. 7 is a perspective view illustrating a conduit stub-up form assembly in accordance with another embodiment of the invention using a push on conduit connector.

Referring to FIG. 12A, the conduit stub-up form 62 comprises a hollow cylindrical body 66 formed by a tubular wall 68 having a shoulder 70 connecting to a neck 72 closed a distal end by an end wall 74. An enlarged head 76 is provided opposite the neck 72 and is configured in the form of a hexagonal nut, as shown in FIG. 7. The form 62 is of plastic construction having a generally smooth outer surface. The tubular wall portion 68 may have a diameter in a range of ½" to ⅞" greater than a diameter of the neck 72. As above, the resulting opening will provide a minimum annular space, on the order of ¼", between the concrete and the extended vertical raceway/conduit to maintain structural integrity and fire ratings. The tubular wall 68 may have a draft of about 1° and a generally uniform wall thickness of about 0.075 inches. The invention is not intended to be limited to any particular size relationship.

As shown in FIG. 12B, the conduit stub-up form 62 may include a cross piece defined by a central interior wall 78, as with the embodiment of FIG. 3B, in the hollow cylindrical body 66 to aid in removal of the form 62, as above.

In this embodiment, the second connector 64B may comprise a push-on connector such as manufactured by Bridgeport Fittings which includes a threading element in the form of a grab ring 80, see FIG. 9, for removably receiving the stub-up form 62 and subsequently the conduit 52. The grab ring 80 has teeth extending inwardly and turned slightly downward. The teeth form a helix or spiral. Consequently, the stub-up form 62 can be inserted into the connector by pushing the stub-up form straight in.

Figure 8:
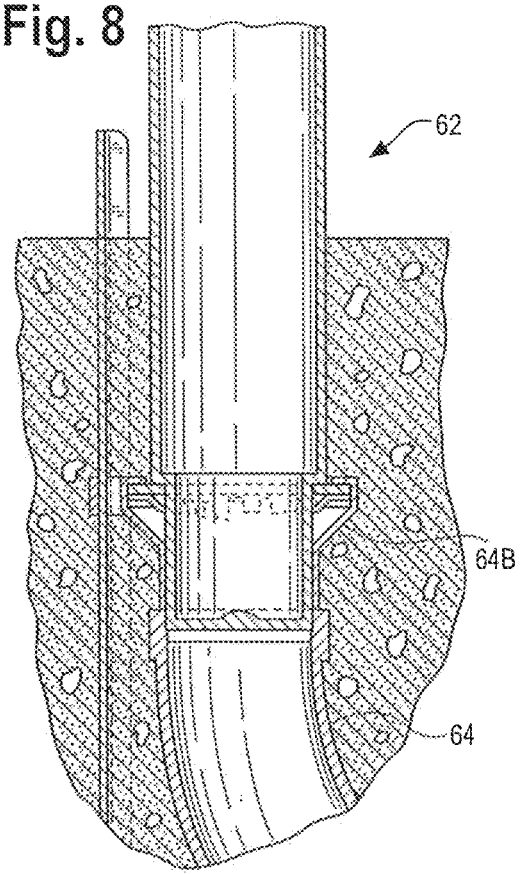
FIG. 8 is a sectional view taken along the line 8-8 of FIG. 7.
Figure 9:
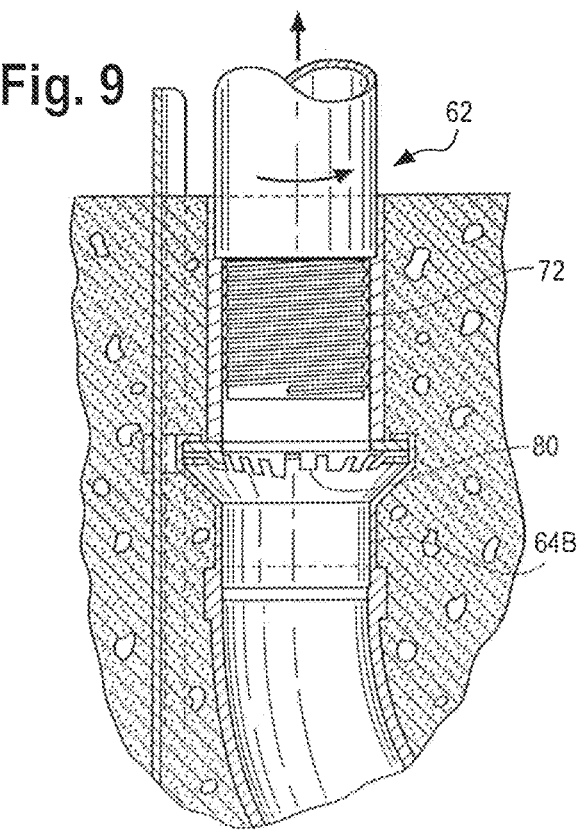
FIG. 9 is a sectional view similar to FIG. 8 showing the conduit stub-up form during removal.

After the concrete is poured, see FIG. 8, then the stub-up form 62 is removed by turning the stub-up form 62, see FIG. 9. The helical grab ring 80 in essence "unthreads" the stub-up form 62, without the use of actual threads molded in the neck 72. However, the teeth may dig into the neck 72 to form threads, as shown in FIG. 9.

Figure 10:
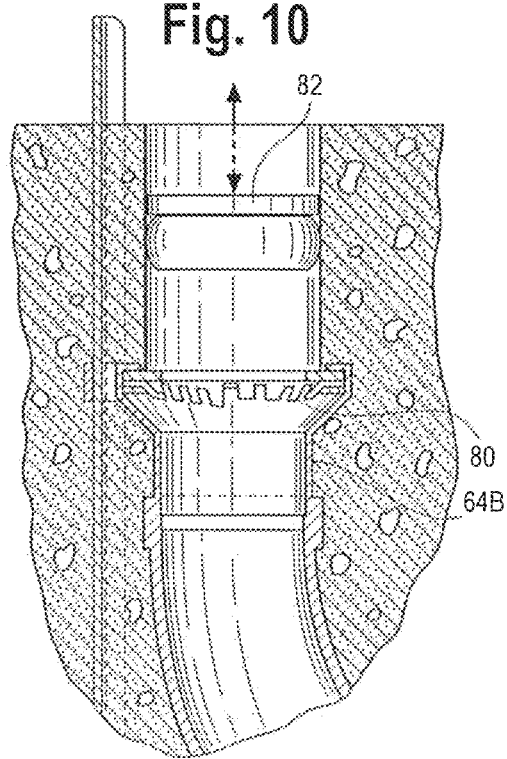
FIG. 10 is a sectional view similar to FIG. 9 illustrating insertion of a plug after removal of the stub-up form.

After removal of the stub-up form 62, then a plug 82 may be temporarily inserted into the opening in the concrete to keep debris out, as shown in FIG. 10. Thereafter, a conduit 52 may be inserted by pushing it into the connector 64B to be held by the grab ring 80, as shown in FIG. 11.

With each of the embodiments described herein, a one piece, plastic stub-up form is used which can be temporarily secured to a conduit connector prior to pouring a deck. After the deck is poured and the concrete is hardened, then the stub-up form can be removed by unthreading the same, as discussed, to be subsequently replaced by a conduit including a threaded connector or using a grab ring connector, as described.

Moreover, these embodiments disclose a method of providing an in-slab conduit stub-up connection which comprises coupling a first end of a conduit connector to an in-slab conduit. A tubular form is coupled with a second end of the conduit connector, the second end having a threading element. The tubular form extends above an intended slab grade. A concrete slab is poured surrounding at least a portion of the in-slab conduit and the conduit connector, with the tubular form extending above the slab. The tubular form is then threadably removed from the conduit connector.

In accordance with the methodology described herein, when used with a push-on connector, the stub-up form could include any sort of tube, pipe or standard tube shape, inclusive of conduit directly, which is threadably removed from the push-on connector after the slab is poured.

FIGS. 13-16 illustrate an adjustable coupling embodiment. In this embodiment all parts are metallic in composition to maintain continuity. This system allows the raceway to be set flush with the top of concrete elevation with little to no comeback until such time that the walls are laid out and ready for the vertical continuation of the metallic raceway (either EMT or RMC).

Figure 13:
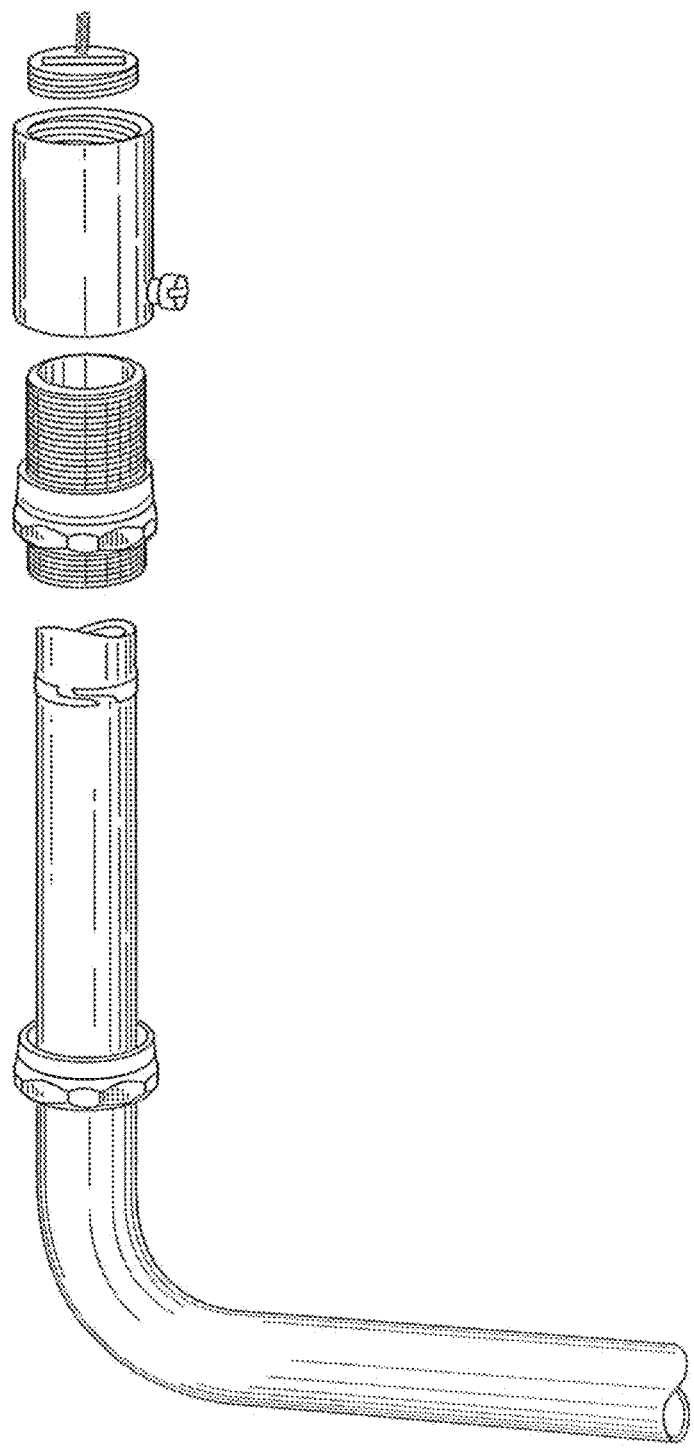
FIGS. 13-16 illustrate an adjustable coupling embodiment of a stub-up application.

FIG. 13 is an exploded view of the entire system. Starting from the top down the first part would be described as a flanged closure plug with a flexible spring pendent that can be hit or knocked down and return to an upright position. This will allow the entire assembly to be located even if the closure plug gets covered with concrete crème or slurry during the finishing process. The intent would be that this part would protect the threaded coupling and able to be removed in the future in order to allow access for the future extension of the vertical metallic raceway (either EMT or RMC). It would also be standard that this part as well as the coupling that it is threaded into would always be set to be flush with the final top of concrete elevation.

The next piece is similar to a standard threaded coupling modified to have a set screw fitting at the bottom to allow this part to be tightened down to the male threads of the adjustment shaft that it is threaded into below it. These two parts work in unison with one another and vary in height by approximately ½" to allow the threaded female coupling to be fully tightened down with enough room for the closure plug to be seated flush with the top of the female threaded coupling or further extension of the raceway. This part can then be adjusted in elevation approximately the full height of the male threads for which it is adjoined. For example this male threaded adjustment shaft would be approximately 1½" and the female threaded coupling would be approximately 2" in height leaving approximately ½" for the closure plug to be seated or threaded conduit to be inserted. This configuration would allow approximately 1½" of adjustment for the female threaded coupling to be leveled with the top of concrete elevation in order to maintain a perfectly flush trip free connection.

Figure 14:
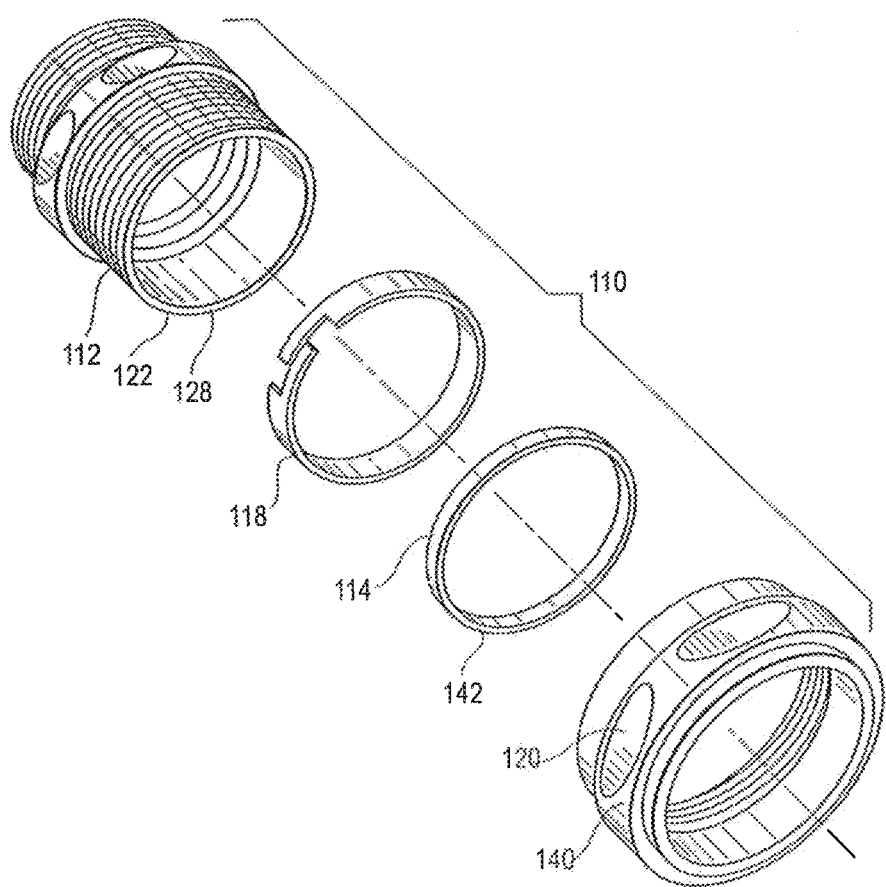

The next part, see FIG. 14, is similar to a compression connector fitting except that the top end of the male thread is extended to allow for maximum adjustment that the female threaded coupling can maneuver along. By eliminating the clamping ring (118), waterproof gasket (114 & 142) and the tightening nut (120 & 140) the lower threads (112) can also be screwed into the short radius elbow as depicted in FIG. 2 of 3.

Figure 15:
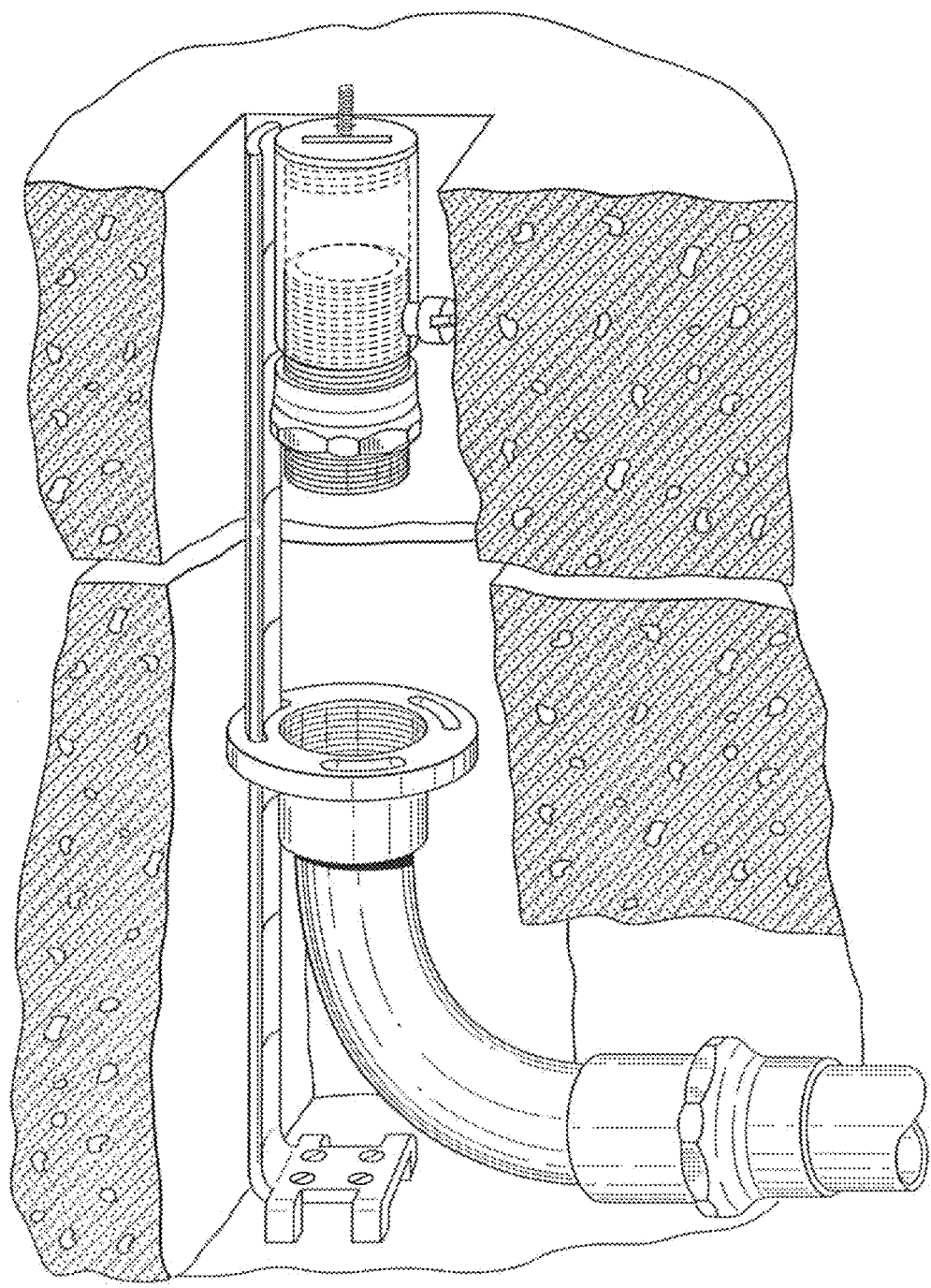

FIG. 15 shows the system being used with a short radius elbow and has the following original components from the previous definitions or explanations. The short radius elbow allows for the use of either EMT conduit with the use of transitional fittings as well as RMC (Rigid Metallic Conduit). This elbow has a flanged end with oblong knock outs to allow the standee support piece to slip through for support and a tie off point. The standee has incremental marks measured for elevation from top of the deck as well as being crimped to allow them to be bent and broke off at specific intervals. There are legs on the standee to allow for concrete to get underneath them in order for them not to be visible on the underside of the deck once it has been stripped. The screw holes allow it to be tightened down to the supporting deck.

Figure 16:
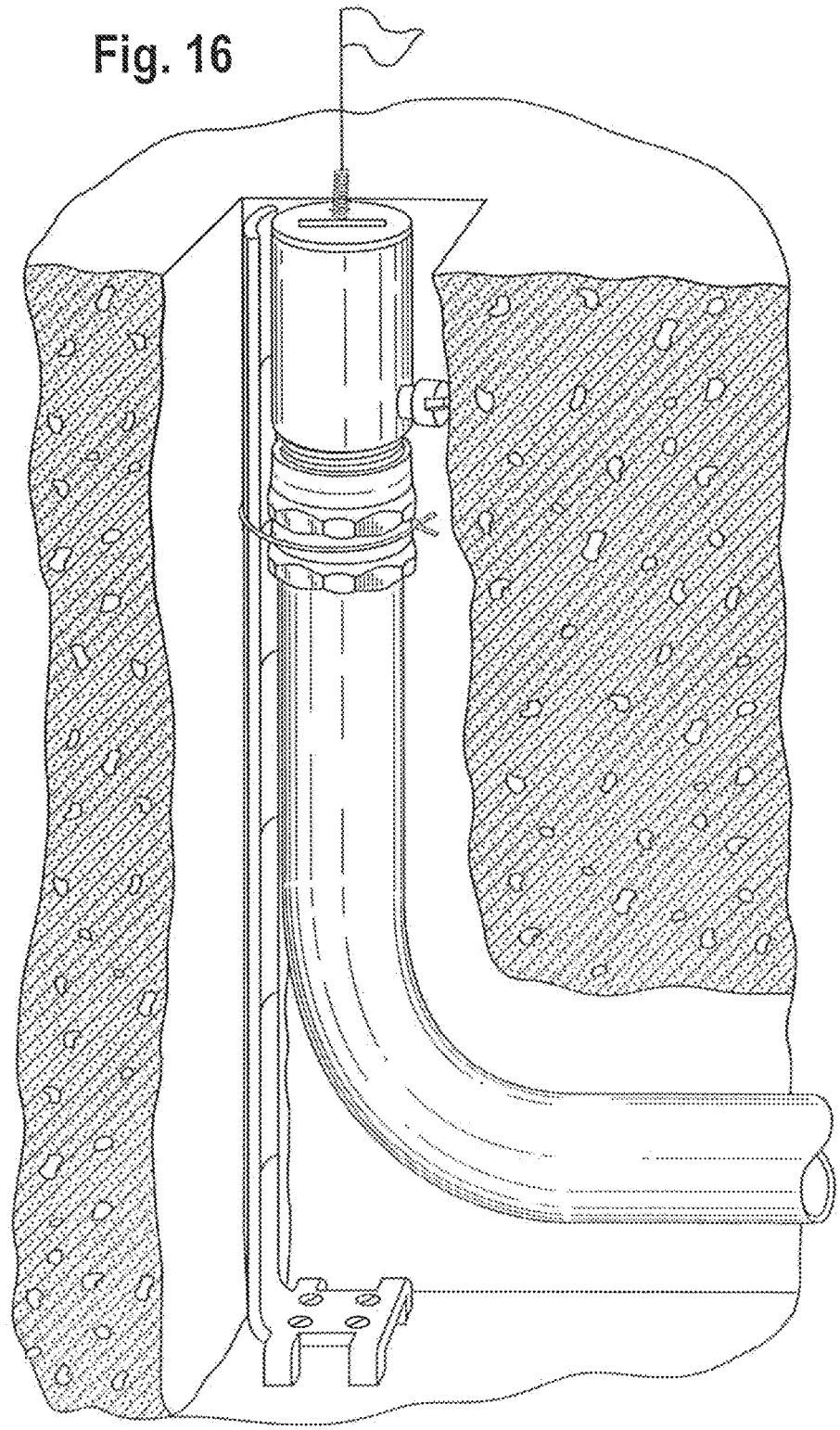
Figure 17:
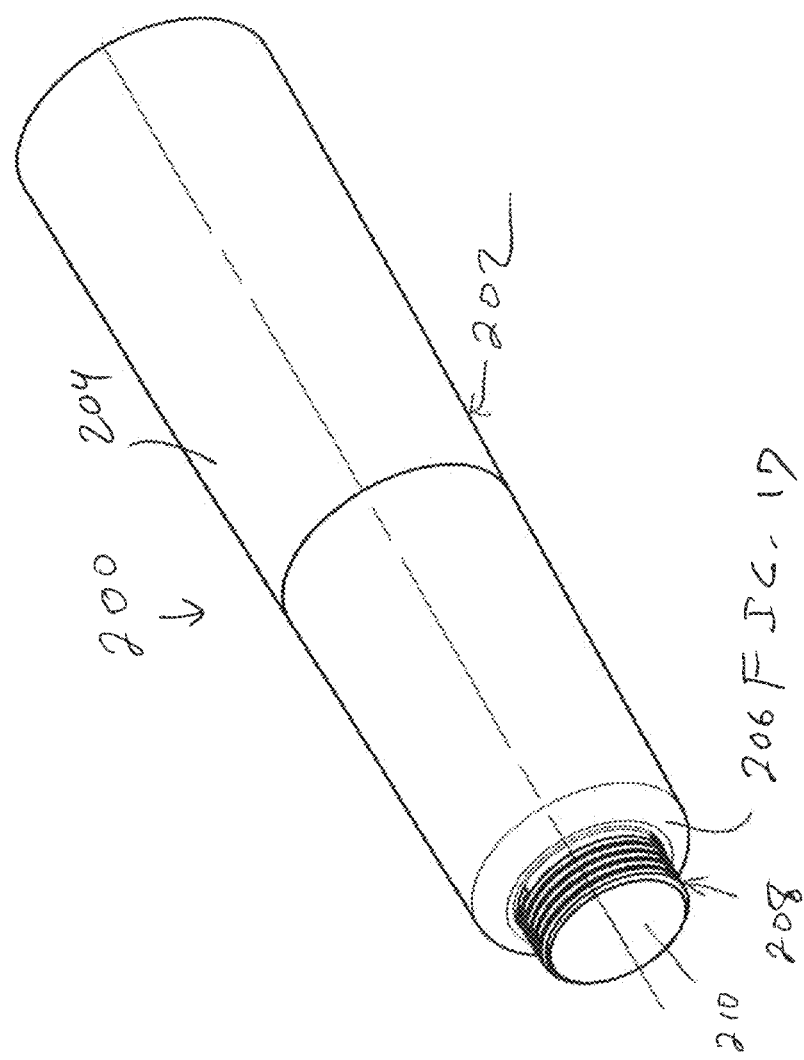
FIG. 17 is a perspective view illustrating a stub-up form in accordance with another embodiment of the invention adapted for removal using a tool head.
Figure 18:
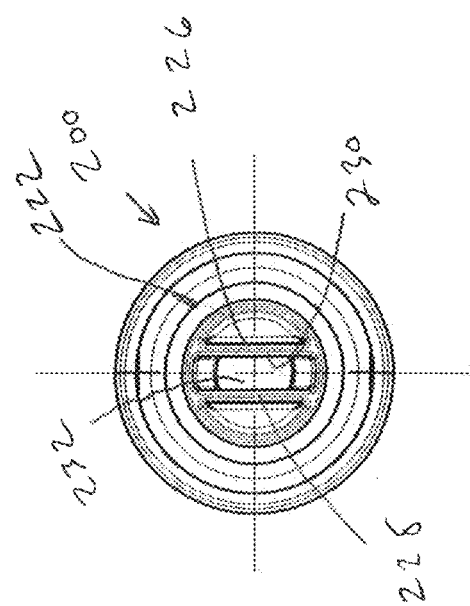
FIG. 18 is a top plan view of the form of FIG. 17.
Figure 22:
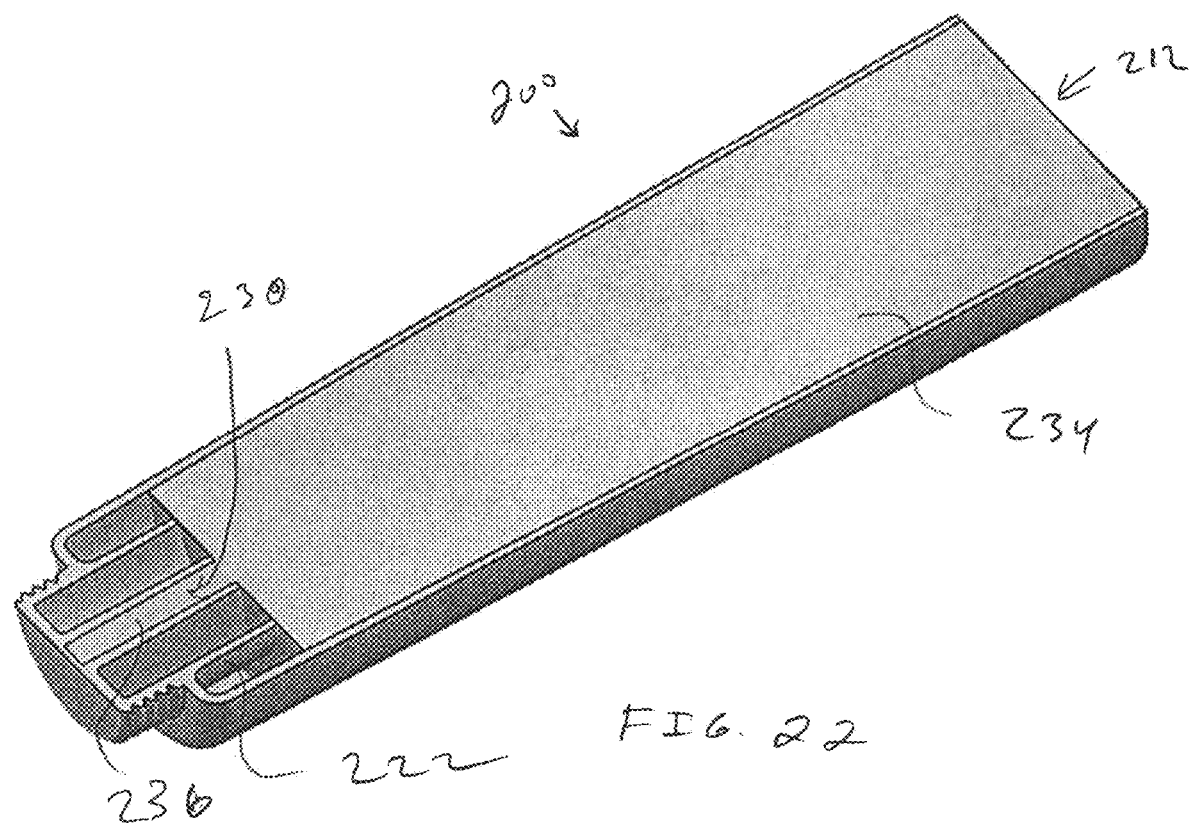
FIG. 22 is a perspective of a sectional view of the stub-up form of FIG. 17 showing a foam fill.

FIG. 16 shows the system being used on an EMT conduit with a standard or tight radius 90-degree bend. This combination is being tied to the support standee using standard tie wire between the tightening nuts of the compression fitting.

Referring to FIG. 17-21, a stub-up form 200 in accordance with another embodiment of the invention is adapted for providing access to an in-slab connector having an opening with a threaded element of a select diameter corresponding to size of an elongate tubular element to be received therein. The connector may, for example, be of the form shown as the elbow 28 in FIG. 1, or the connector 64B shown in FIG. 7.

The stub-up form 200 comprises a hollow unitary plastic body 202 formed by an elongate tubular wall 204 having a shoulder 206 at an end 214 connected to a narrowed cylindrical nose or neck 208 closed at a distal end wall 210 to define an interior space 212. The tubular wall end 214 is rounded where it adjoins the shoulder 206. The tubular wall 204 has a lower portion 216 below a line 218 and an upper portion 220. The lower portion has a 2° taper to provide draft to ease in the extraction of the form 200 from the concrete. The upper portion 220 is cylindrical.

The elongate tubular wall 204 is of a diameter greater than the select diameter corresponding to size of an elongate tubular element to be received in the connector, as with the embodiments above. The neck 208 is threaded and has a size to be removably received in the connector opening. As is apparent, the neck 208 may be provided without a thread if used with the connector 64B, discussed above. The neck 208 extends inwardly from the shoulder 206 into the interior space as defined by an inner cylindrical wall 222. The inner cylindrical wall 222 surrounds a receptacle 224 extending inwardly from the distal end wall 210. The receptacle 224 is for receiving a tool head for removal of the form 200 from an in-slab connector, in use. In the illustrated embodiment, the receptacle 224 comprises opposite planar walls 226 and 228 extending across the cylindrical wall 222 to define a slot 230. The end wall 210 has a recess 232 in the slot 230 where the wall thickness is reduced by ½. The invention is not intended to be limited to any particular size relationship.

In the illustrated embodiment, the size of the threaded neck 208 is adapted to be received in the second threaded opening 28B of the elbow 28, see FIG. 1. This could be sized for ¾" conduit or any other size conduit, as necessary. Indeed, the form may be used for in-slab tubular connections other than conduit, such as for example, plumbing connections and the like.

The form 200 has an increased height compared to other embodiments for visibility and to keep it above the height of the guard of the finishing machines to keep the fan blades from making contact and ripping the threads and the form 200 out of the concrete. The form 200 should not be embedded in concrete past the line 218. The line 218 is the 3" mark as well as a change in draft or taper of the part to indicate the end of allowed embedment. The form 200 is a total of 7 7/16" with the neck 208 and 7" from the shoulder 206. The form 200 has a uniform wall thickness of 0.08", other than as discussed below. As is apparent, other wall thicknesses may be used.

In use, the concrete is poured around the form 200, as above, and as soon as the concrete is set any part of the form 200 extending above the top of concrete is cut off with an oscillation saw or grinder so the part is flush with the top of concrete. Advantageously, the interior space 212 of the form 200 may be filled with a foam body 234. The illustrated foam body 234 extends downwardly to the inner cylindrical wall 222 and has an extension 236 into the slot 230. The foam body 234 keeps concrete out during the pour and protect the receptacle slot 230 from getting construction debris in it prior to extraction to extend the conduit vertically. The foam body 234 is pressure fitted and is removed at the time the form 200 is extracted.

A difference with the design of the form 200 is the method of extraction. The receptacle slot 230 creates a chase for an appropriately sized spade bit to be inserted which would be attached to an electric/battery charged hammer drill that will in turn extract the form 200 from the concrete by applying the majority of force into the male threaded neck 208 which in turn will lift the form 200 enough to remove any forces or bonding of concrete to the outer tubular wall 202 that has a 2° draft taper for the first 3" to allow a release from the concrete within a half of a turn of the threads. In the detail view of FIG. 21 the recess 232 at the center of the receptacle slot 230 is depressed to 0.04" which is ½ the wall thickness of 0.08" to allow the tip of the spade bit to puncture the end wall 210 and allow most the spade bit to sit the tip depth deeper into the slot 230 for more surface contact.

As noted, the stub-up form may be adapted for different sizes of conduit, as necessary or desired. Likewise, the fittings and elbows and the like, would be appropriately sized for the conduit being used.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A stub-up form for providing access to an in-slab connector having an opening with a threaded element of a select diameter corresponding to size of an elongate tubular element to be received therein, comprising:
a hollow unitary plastic body comprising an elongate tubular wall having a shoulder at a lower end connected to a narrowed cylindrical neck extending downward from the shoulder and closed at a distal end wall to define an interior space, the elongate tubular wall having a length greater than a length of the neck and being of a diameter greater than the select diameter and the neck having a size to be removably received in the opening and being engageable by the threaded element, and a receptacle extending from the distal end wall inwardly into the interior space for receiving a tool head for removal of the form from an in-slab connector, in use.

2. The stub-up form of claim 1, wherein the neck comprises a threaded neck.

3. The stub-up form of claim 1, wherein the receptacle comprises opposite planar walls extending across an inside of the neck.

4. The stub-up form of claim 1, further comprising the neck extending inwardly of the shoulder into the interior space to define an inner cylindrical wall.

5. The stub-up form of claim 4, wherein the inner cylindrical wall surrounds the receptacle.

6. The stub-up form of claim 5, wherein the receptacle comprises opposite planar walls extending across the inner cylindrical wall.

7. The stub-up form of claim 1, wherein the distal end wall has a reduced thickness in an area surrounded by the receptacle.

8. The stub-up form of claim 1, wherein the tubular wall has a draft of about 2°.

9. The stub-up form of claim 1 wherein the tubular wall has a lower portion, proximate the shoulder, and an upper portion, and wherein the lower portion has a draft of about 2° and the upper portion has a uniform diameter.

10. The stub-up form of claim 1, wherein the conduit stub-up form has a generally uniform wall thickness of about 0.08".

11. The stub-up form of claim 1, further comprising a foam insert in the interior space.

12. The stub-up form of claim 1, wherein the foam insert extends into the receptacle.

13. A conduit stub-up form for providing access to an in-slab conduit connector having an opening with a threaded element of a select diameter corresponding to size of an elongate conduit to be received therein, comprising:

a hollow unitary plastic body comprising an elongate tubular wall having a shoulder at a lower end connected to a narrowed cylindrical threaded neck extending downward from the shoulder and closed at a distal end wall to define an interior space, the elongate tubular wall having a length tweeter than a length of the neck and being of a diameter greater than the select diameter and the neck having a size to be removably received in the opening and being engageable by the threaded element, and a receptacle comprising a pair of opposite planar walls extending from the distal end wall inwardly into the interior space for receiving a planar tool head for removal of the form from an in-slab conduit connector, in use.

14. The conduit stub-up form of claim 13, further comprising the neck extending inwardly of the shoulder into the interior space to define an inner cylindrical wall and wherein the opposite planar walls extend across the inner cylindrical wall.

15. The conduit stub-up form of claim 13, wherein the distal end wall has a reduced thickness in an area between the opposite planar walls.

16. The conduit stub-up form of claim 13, wherein the tubular wall has a draft of about 2°.

17. The conduit stub-up form of claim 13, wherein the tubular wall has a lower portion, proximate the shoulder, and an upper portion, and wherein the lower portion has a draft of about 2° and the upper portion has a uniform diameter.

18. The conduit stub-up form of claim 13, wherein the form has a generally uniform wall thickness of about 0.08".

19. The conduit stub-up form of claim 13, further comprising a foam insert in the interior space.

20. The conduit stub-up form of claim 13, wherein the foam insert extends into the receptacle.

* * * * *

UNITED STATES PATENT AND TRADEMARK OFFICE
CERTIFICATE OF CORRECTION

PATENT NO. : 10,742,008 B2
APPLICATION NO. : 15/411295
DATED : August 11, 2020
INVENTOR(S) : Jeffrey Krause Page 1 of 1

It is certified that error appears in the above-identified patent and that said Letters Patent is hereby corrected as shown below:

In the Claims

Claim 13, Column 12, Line 4, after "length", delete "tweeter" and substitute therefor --greater--.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*